United States Patent
Tamari (10) Patent No.: US 12,545,264 B2
(45) Date of Patent: Feb. 10, 2026

(54) SYSTEMS AND METHODS FOR PREDICTING DRIVING BEHAVIORS OF DRIVERS BY TRANSFORMING TRIP DATA INTO IMAGE REPRESENTATION

(71) Applicant: QUANATA, LLC, San Francisco, CA (US)

(72) Inventor: Gil Tamari, San Francisco, CA (US)

(73) Assignee: QUANATA, LLC, San Francisco, CA (US)

(*) Notice: Subject to any disclaimer, the term of this patent is extended or adjusted under 35 U.S.C. 154(b) by 70 days.

(21) Appl. No.: 18/375,908

(22) Filed: Oct. 2, 2023

(65) Prior Publication Data

US 2025/0108813 A1    Apr. 3, 2025

(51) Int. Cl.
*B60W 40/09* (2012.01)
*G06T 7/11* (2017.01)
(Continued)

(52) U.S. Cl.
CPC .............. *B60W 40/09* (2013.01); *G06T 7/11* (2017.01); *G06T 11/00* (2013.01); *G06V 10/44* (2022.01); *B60W 2556/10* (2020.02)

(58) Field of Classification Search
CPC ..... B60W 40/90; B60W 2556/10; G06T 7/11; G06T 7/10; G06T 11/00; G06T 11/001; G06T 11/003; G06T 11/005; G06T 11/006; G06T 11/008; G06T 11/20; G06T 11/203; G06T 11/40; G06T 11/60; G06T 2200/00; G06T 2200/04; G06T 2200/08; G06T 2200/28; G06T 2211/00; G06T 2210/00;
(Continued)

(56) References Cited

U.S. PATENT DOCUMENTS

2018/0126980 A1* 5/2018 Kim ................ G08G 1/0133
2019/0176824 A1* 6/2019 Patel ................ B60W 50/14
(Continued)

FOREIGN PATENT DOCUMENTS

CN    113065611 A  *  7/2021  .......... G06F 18/214
CN    114043989 A  *  2/2022  ...... B60W 30/18163
(Continued)

OTHER PUBLICATIONS

"Frequently Asked Questions About DriveEasy", Mar. 20, 2023, Geico (Year: 2023).*
(Continued)

*Primary Examiner* — Erin M Piateski
*Assistant Examiner* — Ashley Tiffany Schoech
(74) *Attorney, Agent, or Firm* — BRYAN CAVE LEIGHTON PAISNER LLP (57) ABSTRACT

Method and system for predicting driving behaviors of a driver by transforming trip data into an image representation are disclosed. For example, the method includes receiving trip data of one or more trips of a driver, dividing the trip data into a plurality of trip data segments based on a predetermined time period, wherein each trip data segment corresponds to a portion of the one or more trips, transforming the plurality of trip data segments into the image representation, and determining predicted driving behaviors of the driver based on the image representation of the one or more trips using a prediction model.

19 Claims, 5 Drawing Sheets

(51) Int. Cl.
  *G06T 11/00*   (2006.01)
  *G06V 10/44*   (2022.01)
(58) Field of Classification Search
  CPC .... G06T 2210/36; G06V 10/44; G06V 10/40;
         G06V 10/82; G06V 10/84
  See application file for complete search history.

(56) References Cited

U.S. PATENT DOCUMENTS

| | | |
|---|---|---|
| 2021/0370955 A1 | 12/2021 | Wong et al. |
| 2021/0387643 A1* | 12/2021 | Hari .................... B60W 30/095 |
| 2022/0139127 A1 | 5/2022 | Boggio |
| 2022/0274603 A1* | 9/2022 | Karve .................... G06N 3/047 |
| 2023/0306321 A1 | 9/2023 | Shao et al. |

FOREIGN PATENT DOCUMENTS

| | | | | |
|---|---|---|---|---|
| CN | 115019275 A | | 9/2022 | |
| CN | 115063976 A | * | 9/2022 | ........... G08G 1/0125 |
| CN | 116740656 A | * | 9/2023 | |
| KR | 102206684 B1 | * | 1/2021 | |
| KR | 1020230108672 | | 7/2023 | |

OTHER PUBLICATIONS

"Safe drivers save more on insurance", Mar. 18, 2023, Geico (Year: 2023).*
Wooya, "patchify 0.2.3", Mar. 14, 2021, pypi.org (Year: 2021).*
"Berkshire Hathaway's Geico launches first telematics program", Jul. 31, 2019, reinsurancene.ws (Year: 2019).*
International Search Report and Written Opinion from corresponding PCT/US2024/049681 dated Jan. 14, 2025 Jan. 14, 2025.

* cited by examiner

SYSTEMS AND METHODS FOR PREDICTING DRIVING BEHAVIORS OF DRIVERS BY TRANSFORMING TRIP DATA INTO IMAGE REPRESENTATION

FIELD OF THE DISCLOSURE

Some embodiments of the present disclosure are directed to determining predicted driving behaviors of a driver by transforming trip data into an image representation. More particularly, certain embodiments of the present disclosure provide methods and systems for determining predicted driving behaviors of a driver by transforming at least a portion of trip data of the driver into the image representation to be used to train a predictive model. Merely by way of example, the present disclosure has been applied to transforming trip data of a driver into an image representation that represents at least a portion of the trip data, training a predictive model using the transformed image representation of the trip data, and determining predicted driving behaviors of the driver using the trained predictive model. But it would be recognized that the present disclosure has much broader range of applicability.

BACKGROUND OF THE DISCLOSURE

Driving behaviors of drivers may be predicted based on trip data collected by one or more sensors of the mobile devices and/or vehicles. However, in some cases, the trip data may include enormous amount of data from a number of sensors that may not be easily interpretable or understandable by a predictive model to extract unique features that represent driving behaviors of a driver. The limitations of current computing resources (processors and memory) also lead to inability for predictive models to fully extract all the data to input and/or train the models. Hence it is highly desirable to develop more accurate techniques for transforming or translating trip data into a format that can be effectively and accurately interpreted and understood by a predictive model.

BRIEF SUMMARY OF THE DISCLOSURE

Some embodiments of the present disclosure are directed to determining predicted driving behaviors of a driver by transforming trip data into an image representation. More particularly, certain embodiments of the present disclosure provide methods and systems for determining predicted driving behaviors of a driver by transforming at least a portion of trip data of the driver into an image representation to be used to train a predictive model. Merely by way of example, the present disclosure has been applied to transforming trip data of a driver into an image representation that represents at least a portion of the trip data, training a predictive model using the transformed image representation of the trip data, and determining predicted driving behaviors of the driver using the trained predictive model. But it would be recognized that the present disclosure has much broader range of applicability.

According to some embodiments, a method for predicting driving behaviors of a driver by transforming trip data into an image representation includes receiving trip data of one or more trips of a driver and dividing the trip data into a plurality of trip data segments based on a predetermined time period. Each trip data segment corresponds to a portion of the one or more trips. The method further includes transforming the plurality of trip data segments into the image representation, and determining predicted driving behaviors of the driver based on the image representation of the one or more trips using a prediction model.

According to certain embodiments, a computing device for predicting driving behaviors of a driver by transforming trip data into an image representation includes a processor and a memory having a plurality of instructions stored thereon that, when executed by the processor. The instructions, when executed, cause the one or more processors to receive trip data of one or more trips of a driver and divide the trip data into a plurality of trip data segments based on a predetermined time period. Each trip data segment corresponds to a portion of the one or more trips. Also, the instructions, when executed, cause the one or more processors to transform the plurality of trip data segments into the image representation, and determine predicted driving behaviors of the driver based on the image representation of the one or more trips using a prediction model.

According to some embodiments, a non-transitory computer-readable medium stores instructions for predicting driving behaviors of a driver by transforming trip data into an image representation. The instructions are executed by one or more processors of a computing device. The non-transitory computer-readable medium includes instructions receive trip data of one or more trips of a driver, and divide the trip data into a plurality of trip data segments based on a predetermined time period. Each trip data segment corresponds to a portion of the one or more trips. Also, the non-transitory computer-readable medium includes instructions to transform the plurality of trip data segments into the image representation, and determine predicted driving behaviors of the driver based on the image representation of the one or more trips using a prediction model.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to determining predicted driving behaviors of a driver by transforming trip data into an image representation. As used herein, trip data may include various sensors (e.g., vehicle, mobile devices, external imaging devices) that collect data such as telematics, vehicle data from OBD ports, ADAS data, images, contextual data like weather and traffic and the like. More particularly, certain embodiments of the present disclosure provide methods and systems for determining predicted driving behaviors of a driver by transforming at least a portion of trip data of the driver into the image representation to be used to train a predictive model. Merely by way of example, the present disclosure has been applied to transforming trip data of a driver into the image representation that represents at least a portion of the trip data, training a predictive model using the transformed image representation of the trip data, and determining predicted driving behaviors of the driver using the trained predictive model. But it would be recognized that the present disclosure has much broader range of applicability.

Figure 1:
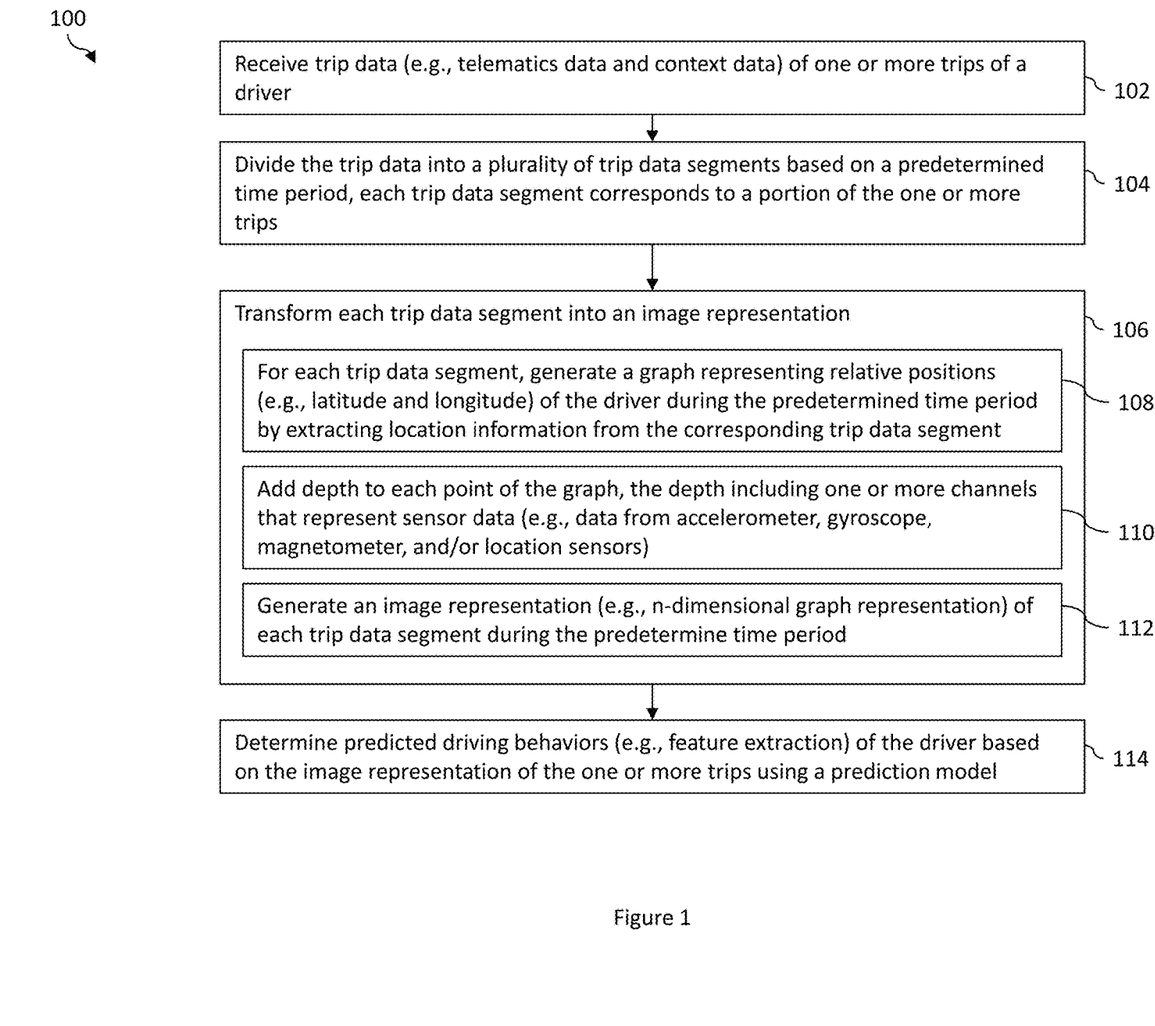
FIG. 1 is a simplified diagram showing a method for determining predicted driving behaviors of a driver based on trip data of the driver using a prediction model according to certain embodiments of the present disclosure.

I. One or More Methods for Determining Predicted Driving Behaviors of a Driver Based on Trip Data of the Driver Using a Prediction Model According to Certain Embodiments FIG. 1 is a simplified diagram showing a method 100 for determining predicted driving behaviors of a driver based on trip data of the driver using a prediction model according to certain embodiments of the present disclosure. One of ordinary skill in the art would recognize many variations, alternatives, and modifications. In some embodiments, the method 100 is performed by a computing device (e.g., a server 506).

The method 100 includes process 102 for receiving trip data of one or more trips of a driver, process 104 for dividing the trip data into a plurality of trip data segments based on a predetermined time period, process 106 for transforming each trip data segment into an image representation, and process 114 for determining predicted driving behaviors of the driver based on the image representation of the one or more trips using a prediction model.

Specifically, at the process 102, the trip data includes telematics data, vehicle data, ADAS data, images, contextual data associated with the one or more trips. The telematics data is collected during one or more trips of a driver and indicates driving behaviors of the driver during the one or more trips. As an example, the driving behavior represents a manner in which the driver has operated a vehicle, such as the driver's driving habits and/or driving patterns. The telematics data may be collected from one or more sensors associated with a vehicle and/or a driver's computing device such as a mobile device. For example, the one or more sensors include any type and number of accelerometers, gyroscopes, magnetometers, location sensors (e.g., GPS sensors), and/or any other suitable sensors that measure the state and/or movement of the vehicle and/or the mobile device. The computing device as used herein may be a wearable computing device such as a ring, watch, glasses, bracelet, and the like. In certain embodiments, the telematics data may be collected continuously or at predetermined time intervals.

In the illustrative embodiment, the trip data may further include context data. For example, the context data includes road data, driver data, and/or world data. The road data associated with the one or more trips includes information about one or more roads taken during the one or more trips. For example, the road data includes a type of the road (e.g., highway, freeway, toll, local, or parking lot), a road map (e.g., curvature, incline, gradient, elevation, direction, and/or a number of lanes), and/or road conditions (e.g., road moisture, traffic). The driver data associated with the one or more trips of a driver includes any socio-demographic information of the driver. For example, the driver data includes age, race, ethnicity, gender, marital status, income, education, employment, and/or credit score. The world data associated with the one or more trips includes an indication whether the one or more trips was taken on a holiday, a weather condition during the one or more trips, and/or an indication of when the one or more trips was taken (e.g., time of day, day of week, day of month, and/or month of year).

At the process 104, each trip data segment corresponds to a portion of the one or more trips for the predetermined time period. For example, each trip may be divided into a plurality of trip data segments every 5 minutes. According to some embodiments, the trip data collected during a first predetermined time period of each trip may be selected and further divided into a second predetermined time period. For example, first 15 minute of trip data is selected for each trip and is then divided into three 5-minute segments.

According to some embodiments, each trip data segment may correspond to a portion of the one or more trips for a predetermined distance. For example, each trip may be divided into a plurality of trip data segments every 5 miles. According to some embodiments, the trip data collected during a first predetermined distance of each trip may be selected and further divided into a second predetermined distance. For example, first 20 miles of trip data is selected for each trip and is then divided into four-5 mile segments.

Figure 3:
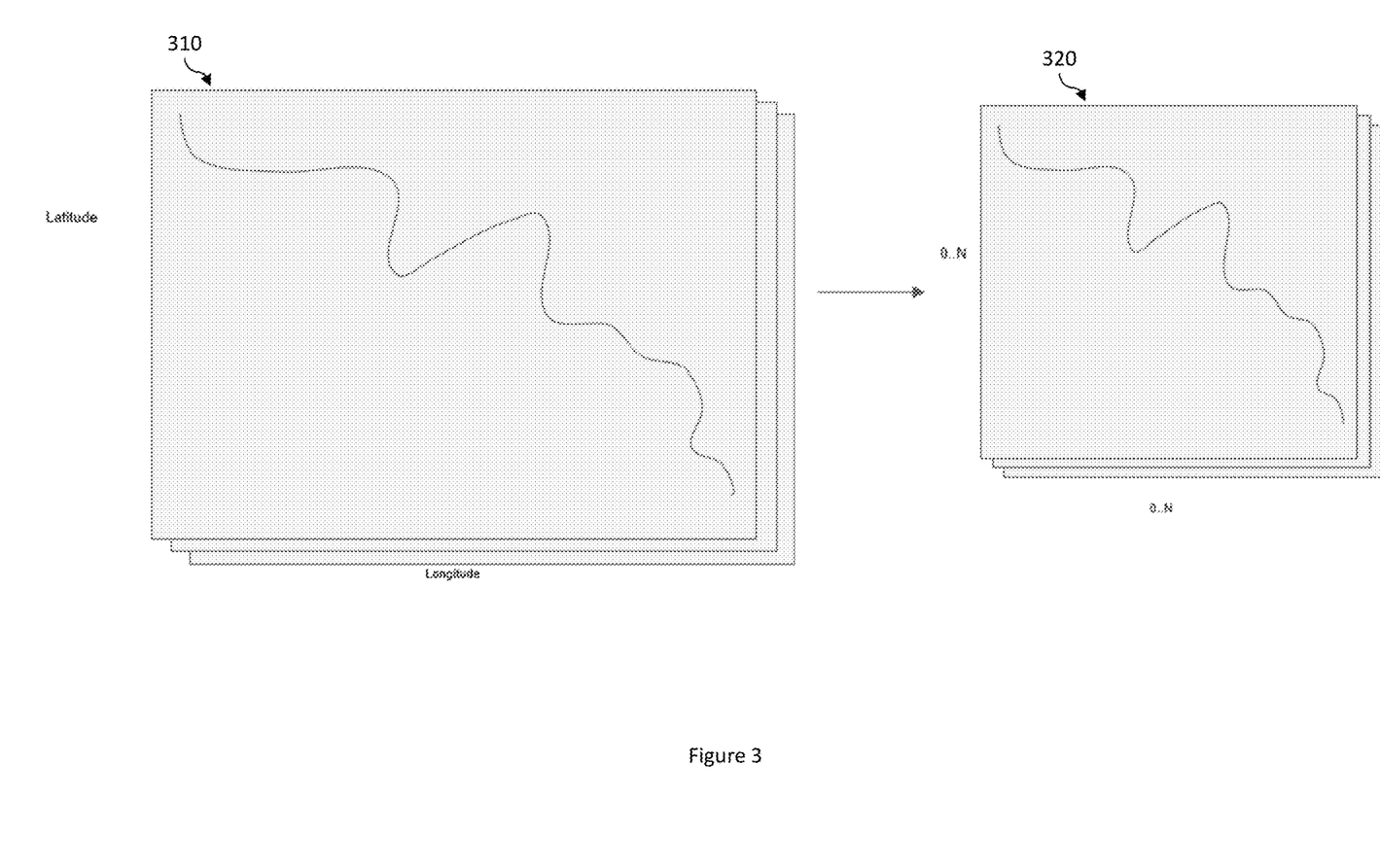
FIG. 3 is an exemplary diagram illustrating transformation of trip data into graphical representations of an image representation of trip data according to certain embodiments of the present disclosure.

At the process 106, each trip data segment is transformed into an image representation. For example, the image representation is a high-depth image-like tensor. To do so, at process 108, for each trip data segment, a graphical representation representing relative positions (e.g., latitude and longitude) of the driver during the predetermined time period is generated by extracting location information from the corresponding trip data segment. In other words, the relative longitude and latitude coordinates are used as indexes to generate the graphical representation as illustrated in FIG. 3.

Once the graphical representation is generated, at process 110, depth to each point of the graphical representation is added. For example, the depth includes one or more channels that represent sensor data. As described above, the sensor data may be collected from one or more sensors associated with a vehicle and/or a driver's mobile device. For example, the one or more sensors include any type and number of accelerometers, gyroscopes, magnetometers, location sensors (e.g., GPS sensors), and/or any other suitable sensors that measure the state and/or movement of the vehicle and/or the mobile device. For example, the sensor data may include speed, acceleration, braking, orientation and angular velocity, direction, heading, location, idling time, and/or fuel consumption. It should be appreciated that, according to certain embodiments, the one or more channels may include a time channel to, for example, indicate a chronological sequence of the graphical representations.

At process 112, an image representation of each trip data segment is generated. For example, each image representation is a n-dimensional graphical representation. As described above, according to some embodiments, each image representation maps relative positions of the driver during the predetermined time period. For example, location data of the trip data is used to plot relative longitude and latitude coordinates of the driver for each predetermined time period. In other words, the relative longitude and latitude coordinates are used as indexes to generate the graphical representation. For each point of the graphical representation, n-number of sensor data is added to generate a n-dimensional graphical representation of the corresponding trip data segment.

At the process 114, a prediction model is used to predict driving behaviors of the driver based on the image representation of the one or more trips. Specifically, the prediction model is a predictive model that is trained to extract features from the image representation of data segments associated with the one or more trips of the driver. Extracted features are indicative of one or more driving behaviors of the driver. For example, the extracted features may include sudden acceleration or braking, frequent braking, sharp cornering, and/or slow cornering. According to some embodiments, the driving behaviors of the driver are predicted based on the extracted features. For example, driving behaviors of the driver in a next trip are predicted based on one or more features extracted from the trip data of one or more trips taken by the driver using the prediction model. By being able to have or use the extracted features, a more accurate prediction can be done using a predictive model then with simple telematics data.

According to some embodiments, the image representation of the one or more trips may be further divided into smaller patches using a patchify algorithm. For example, the image representation may be 20×20 pixel image, which can be divided into 1000 square patches of 2×2 pixel each. These smaller patches may be inputted into the prediction model. The prediction model may be any predictive model that is trained using a deep learning algorithm, such as a convolution neural network (CNN).

Figure 2:
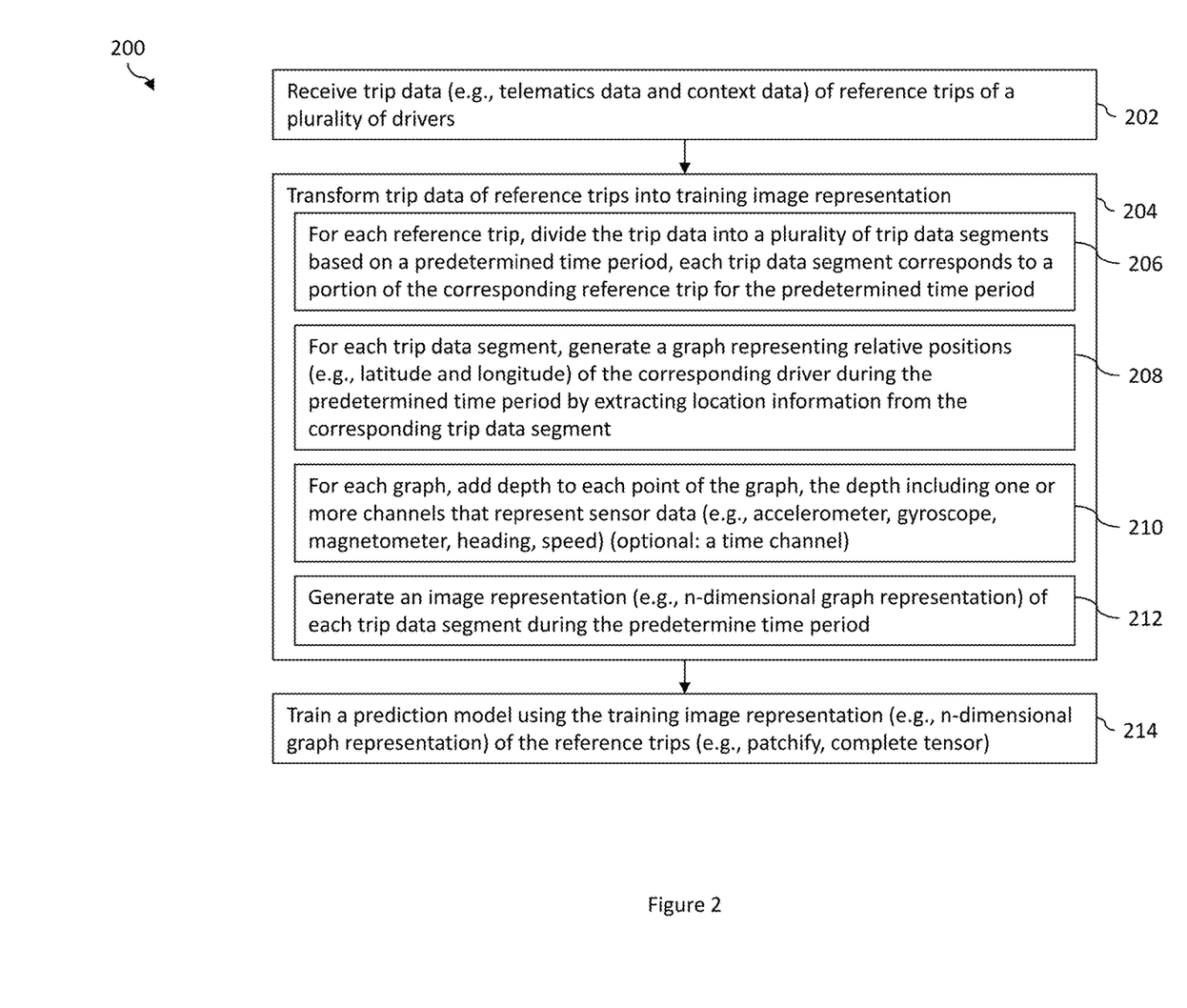
FIG. 2 is a simplified diagram showing a method for training a prediction model for predicting driving behaviors of a driver according to certain embodiments of the present disclosure.

II. One or More Systems for Training a Prediction Model According to Certain Embodiments FIG. 2 is a simplified diagram showing a method 200 for training a prediction model for predicting driving behaviors of a driver according to certain embodiments of the present disclosure. This diagram is merely an example, which should not unduly limit the scope of the claims. One of ordinary skill in the art would recognize many variations, alternatives, and modifications. In the illustrative embodiment, the method 200 is performed by a computing device (e.g., a server 506).

The method 200 includes process 202 for receiving trip data of reference trips of a plurality of drivers, process 204 for transforming the trip data of the reference trips into a training image representation, and process 214 for training a prediction model using the training image representation of the reference trips. The plurality of drivers may be similar situated group of drivers such as having one or more similar occupation, locality, vehicles, age, education, driving record, and the like.

Specifically, at the process 202, the trip data includes telematics data, vehicle data, ADAS data, images, contextual data associated with the one or more reference trips. The telematics data is collected during one or more reference trips of the plurality of drivers and indicates driving behaviors of each driver during one or more reference trips taken by the corresponding driver. As an example, the driving behavior represents a manner in which the corresponding driver has operated a vehicle such as the driver's driving habits and/or driving patterns. The telematics data may be collected from one or more sensors associated with a vehicle and/or a driver's mobile device. For example, the one or more sensors include any type and number of accelerometers, gyroscopes, magnetometers, location sensors (e.g., GPS sensors), and/or any other suitable sensors that measure the state and/or movement of the vehicle and/or the mobile device. In certain embodiments, the telematics data may be collected continuously or at predetermined time intervals.

In the illustrative embodiment, the trip data may further include context data. For example, the context data includes road data, driver data, and/or world data. The road data associated with the one or more reference trips includes information about one or more roads taken during the one or more reference trips. For example, the road data includes a type of the road (e.g., highway, freeway, toll, local, or parking lot), a road map (e.g., curvature, incline, gradient, elevation, direction, and/or a number of lanes), and/or road conditions (e.g., road moisture, traffic). The driver data associated with the one or more reference trips of a driver includes any socio-demographic information of the driver. For example, the driver data includes age, race, ethnicity, gender, marital status, income, education, employment, and/or credit score. The world data associated with the one or more reference trips includes an indication whether the one or more reference trips was taken on a holiday, a weather condition during the one or more reference trips, and/or an indication of when the one or more reference trips was taken (e.g., time of day, day of week, day of month, and/or month of year).

At the process 204, training image representation are generated using the trip data of the reference trips. For example, the image representation is a high-depth image-like tensor. To do so, at process 206, for each reference trip, the trip data is divided into a plurality of trip data segments based on a predetermined time period. Each trip data segment corresponds to a portion of the corresponding reference trip for the predetermined time period. For example, each reference trip may be divided into a plurality of trip data segments every 5 minutes. According to some embodiments, the trip data collected during a first predetermined time period of each reference trip may be selected and further divided into a second predetermined time period. For example, first 15 minute of trip data is selected for each reference trip and is then divided into three 5-minute segments.

According to some embodiments, each trip data segment may correspond to a portion of the one or more trips for a predetermined distance. For example, each trip may be divided into a plurality of trip data segments every 5 miles. According to some embodiments, the trip data collected during a first predetermined distance of each trip may be selected and further divided into a second predetermined distance. For example, first 20 miles of trip data is selected for each trip and is then divided into four-5 mile segments.

Figure 4:
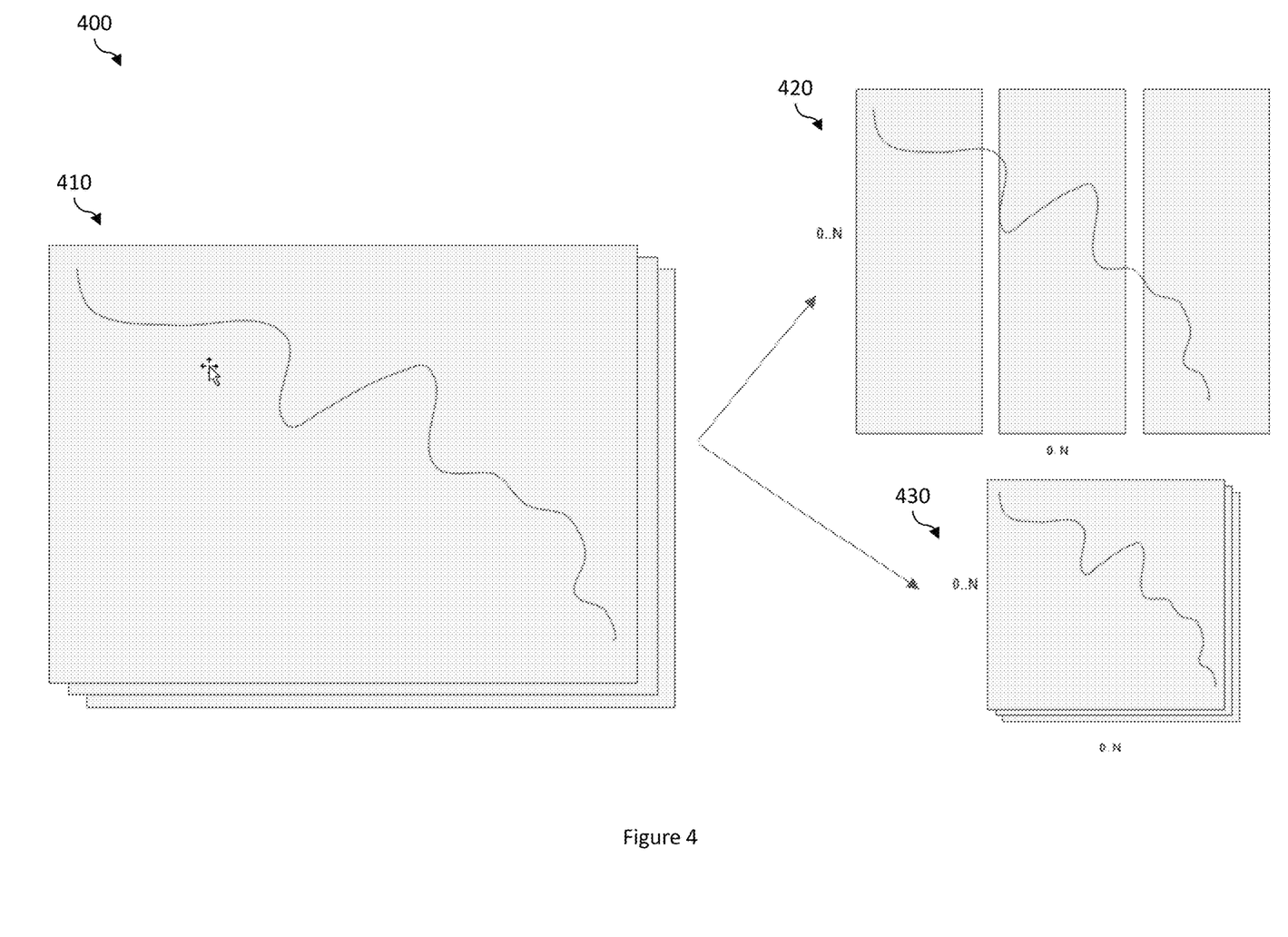
FIG. 4 is an exemplary diagram illustrating using an image representation of the trip data to predict driving behavior of a driver using a trained prediction model according to certain embodiments of the present disclosure.

At process 208, for each trip data segment, a graphical representation representing relative positions (e.g., latitude and longitude) of the corresponding driver during the predetermined time period is generated by extracting location information from the corresponding trip data segment. In other words, the relative longitude and latitude coordinates are used as indexes to generate the graphical representation as illustrated in FIG. 4.

Once the graphical representation is generated, at process 210, depth to each point of the graphical representation is added. For example, the depth includes one or more channels that represent sensor data. As described above, the sensor data may be collected from one or more sensors associated with a vehicle and/or a driver's mobile device. For example, the one or more sensors include any type and number of accelerometers, gyroscopes, magnetometers, location sensors (e.g., GPS sensors), and/or any other suitable sensors that measure the state and/or movement of the vehicle and/or the mobile device. For example, the sensor data may include speed, acceleration, braking, orientation and angular velocity, direction, heading, location, idling time, and/or fuel consumption. It should be appreciated that, according to certain embodiments, the one or more channels may include a time channel to, for example, indicate a chronological sequence of the graphical representations.

At process 212, an image representation of each trip data segment is generated. For example, each image representation is a n-dimensional graphical representation. As described above, according to some embodiments, each image representation maps relative positions of the corresponding driver during the predetermined time period. For example, location data of the trip data is used to plot relative longitude and latitude coordinates of the corresponding driver for each predetermined time period. In other words, the relative longitude and latitude coordinates are used as indexes to generate the graphical representation. For each point of the graphical representation, n-number of sensor data is added to generate a n-dimensional graphical representation of the corresponding trip data segment. According to some embodiments, the processes 206-212 repeat until all the trip data segments of the reference trips are transformed into the image representation, which are used to train a prediction model. In another embodiment, the prediction model may be a generative artificial intelligence (AI) model.

At the process 214, the image representation transformed from the trip data of reference trips are used as training data to train the prediction model for predicting driving behaviors of a driver. For example, the prediction model may be trained using a deep learning algorithm, such as a convolution neural network (CNN). For example, the prediction model may be an auto-regressive model or a causal auto-regressive model that predicts future behavior based on past behavior data. According to some embodiments, each training image representation may be further divided into smaller patches (e.g., 420) prior to training the prediction model, as illustrated in FIG. 4. For example, the training image representation may be 20×20 pixel image, which can be divided into 1000 square patches of 2×2 pixel each.

Specifically, the prediction model is trained to extract features from image representation of data segments of a driver. Extracted features are indicative of one or more driving behaviors of the corresponding driver. For example, the extracted features may include sudden acceleration or braking, frequent braking, sharp cornering, and/or slow cornering. According to some embodiments, the driving behaviors of the corresponding driver are predicted based on the extracted features. For example, driving behaviors of the corresponding driver in a next trip (e.g., a next patch or a next trip data segment) are predicted based on one or more features extracted from the trip data of one or more trips taken by the corresponding driver using the prediction model.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the methods 100 and 200 are described as performed by the computing device above, some or all processes of the method are performed by any computing device or a processor directed by instructions stored in memory. As an example, some or all processes of the method are performed according to instructions stored in a non-transitory computer-readable medium.

FIG. 3 is an exemplary diagram 300 illustrating transformation of trip data into graphical representations of image representation of trip data according to certain embodiments of the present disclosure. As described above in FIGS. 1 and 2, trip data may be transformed into an image representation that can be interpreted and understood by a prediction model. To do so, the trip data is divided into a plurality of trip data segments based on a predetermined time period or predetermined distance. For example, each reference trip may be divided into a plurality of trip data segments every 5 minutes. According to some embodiments, the trip data collected during a first predetermined time period of each reference trip may be selected and further divided into a second predetermined time period. For example, first 15 minute of trip data is selected for each reference trip and is then divided into three 5-minute segments. Additionally, each image representation is a n-dimensional graphical representation.

As described above, according to some embodiments, each image representation maps relative positions of the driver during the predetermined time period. For example, location data of the trip data is used to plot relative longitude and latitude coordinates of the driver for each predetermined time period, as illustrated in the graphical representations 310. In other words, each graphical representation 310 corresponds to relative positions of the driver during the predetermine time period. Since the relative positions are not absolute positional data, the relative longitude and latitude coordinates of the graphical representations 310 can be used as indexes (e.g., 0 to N) to generate the graphical representations 320. For each point of the graphical representation 320, n-number of sensor data is added to generate a n-dimensional graphical representation of the corresponding trip data segment. It should be noted that the graphical representations 310 and 320 are not drawn to scale.

FIG. 4 is an exemplary diagram 400 illustrating using image representation of the trip data to predict driving behavior of a driver using a trained prediction model according to certain embodiments of the present disclosure. Similar to the graphical representation 310, each graphical representation 410 represents relative longitude and latitude coordinates of the driver during a predetermined time period by extracting location data of the trip data. Since the relative positions are not absolute positional data, the relative longitude and latitude coordinates of the graphical representations 410 can be used as indexes (e.g., 0 to N) to generate the graphical representations 430, which may be fed into a prediction model for predicting driving behaviors of a driver. As described above, the prediction model is trained using a deep learning algorithm, such as a convolution neural network (CNN). In some embodiments, the graphical representations 410 may be further divided into smaller patches 420 using a patchify algorithm. It should be appreciated that for each point of the graphical representation 410, n-number of sensor data may be added to generate a n-dimensional graphical representation of the corresponding trip data segment, prior to dividing into smaller patches 420. In other words, the smaller patches 420 are also n-dimensional graphical representation of a corresponding portion of the trip data segment. The smaller patches 420 may then be fed into the prediction model for predicting driving behaviors of a driver. It should be noted that the graphical representations 410, 420, 430 are not drawn to scale.

Figure 5:
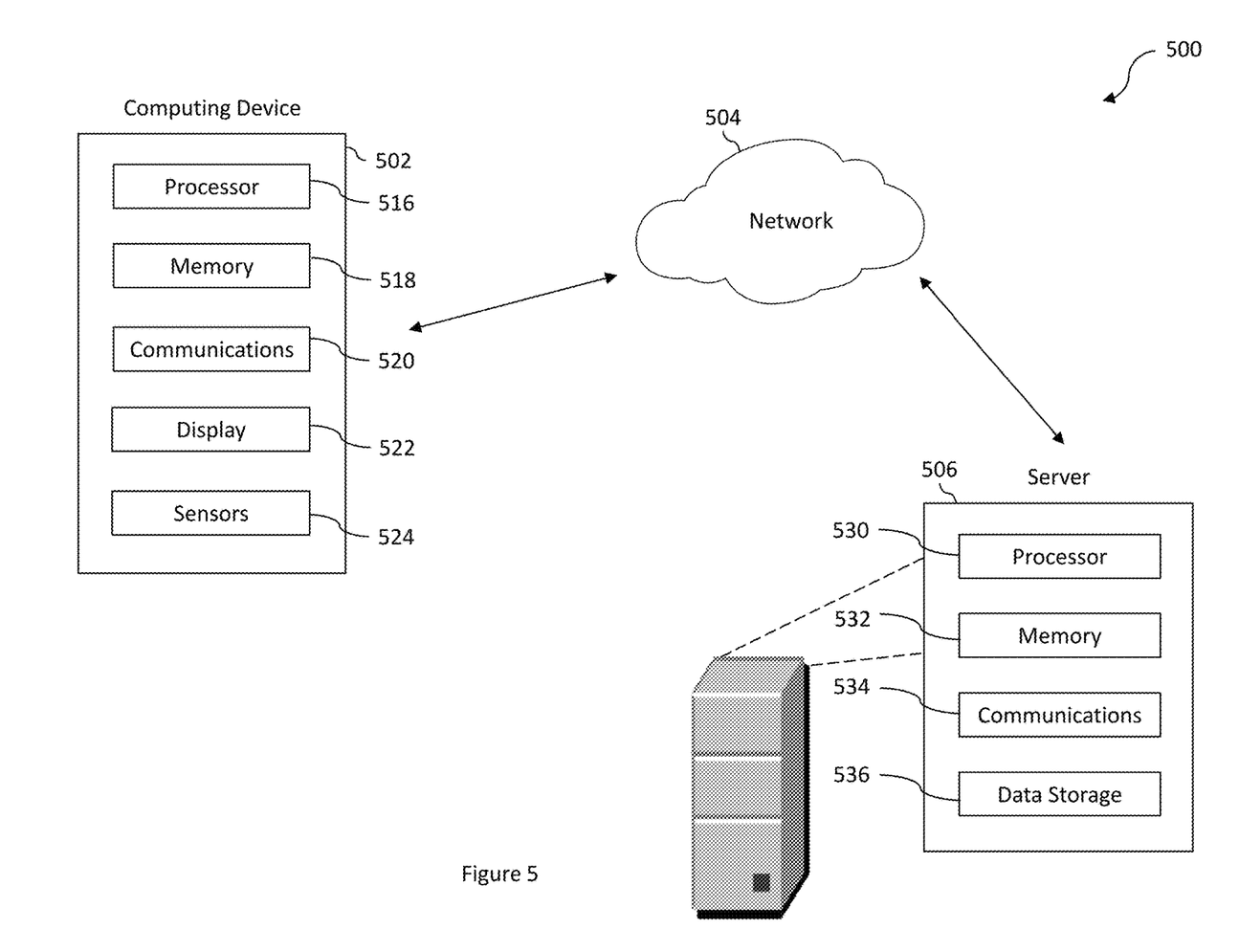
FIG. 5 is a simplified diagram showing a system for determining predicted driving behaviors of a driver based on trip data of the driver using a prediction model according to certain embodiments of the present disclosure.

FIG. 5 is a simplified diagram showing a system for determining predicted driving behaviors of a driver according to certain embodiments of the present disclosure. This diagram is merely an example, which should not unduly limit the scope of the claims. One of ordinary skill in the art would recognize many variations, alternatives, and modifications. In the illustrative embodiment, the system 500 includes a computing device 502, a network 504, and a server 506. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 500 is used to implement the method 100 the method 200, the method 300, and/or the method 400. According to certain embodiments, the mobile device 502 is communicatively coupled to the server 506 via the network 504. The computing device 502 may be a mobile device or a vehicle system. As an example, the mobile device 502 includes one or more processors 516 (e.g., a central processing unit (CPU), a graphics processing unit (GPU)), a memory 518 (e.g., random-access memory (RAM), read-only memory (ROM), flash memory), a communications unit 520 (e.g., a network transceiver), a display unit 522 (e.g., a touchscreen), and one or more sensors 524 (e.g., an accelerometer, a gyroscope, a magnetometer, a location sensor). For example, the one or more sensors 524 are configured to generate sensor data. According to some embodiments, the data are collected continuously, at predetermined time intervals, and/or based on a triggering event (e.g., when each sensor has acquired a threshold amount of sensor measurements).

In some embodiments, the mobile device 502 is operated by the user. For example, the user installs an application associated with an insurer on the mobile device 502 and allows the application to communicate with the one or more sensors 524 to collect sensor data. According to some embodiments, the application collects the sensor data continuously, at predetermined time intervals, at predetermined distance, and/or based on a triggering event (e.g., when each sensor has acquired a threshold amount of sensor measurements). In certain embodiments, the sensor data represents the user's activity/behavior, such as the user driving behavior, in the method 100, the method 200, the method 300, and/or the method 400.

According to certain embodiments, the collected data are stored in the memory 518 before being transmitted to the server 506 using the communications unit 522 via the network 504 (e.g., via a local area network (LAN), a wide area network (WAN), the Internet). In some embodiments, the collected data are transmitted directly to the server 506 via the network 504. In certain embodiments, the collected data are transmitted to the server 506 via a third party. For example, a data monitoring system stores any and all data collected by the one or more sensors 524 and transmits those data to the server 506 via the network 504 or a different network.

According to certain embodiments, the server 506 includes a processor 530 (e.g., a microprocessor, a microcontroller), a memory 532, a communications unit 534 (e.g., a network transceiver), and a data storage 536 (e.g., one or more databases). In some embodiments, the server 506 is a single server, while in certain embodiments, the server 506 includes a plurality of servers with distributed processing. As an example, in FIG. 5, the data storage 536 is shown to be part of the server 506. In some embodiments, the data storage 536 is a separate entity coupled to the server 506 via a network such as the network 504. In certain embodiments, the server 506 includes various software applications stored in the memory 532 and executable by the processor 530. For example, these software applications include specific programs, routines, or scripts for performing functions associated with the method 100, the method 200, the method 300, and/or the method 400. As an example, the software applications include general-purpose software applications for data processing, network communication, database management, web server operation, and/or other functions typically performed by a server.

According to various embodiments, the server 506 receives, via the network 504, the sensor data collected by the one or more sensors 524 from the application using the communications unit 534 and stores the data in the data storage 536. For example, the server 506 then processes the data to perform one or more processes of the method 100, one or more processes of the method 200, one or more processes of the method 300, and/or one or more processes of the method 400.

According to certain embodiments, the notification in response to the application being determined not working properly in the method 100, the method 200, the method 300, and/or the method 400 is transmitted back to the mobile device 502, via the network 504, to be provided (e.g., displayed) to the user via the display unit 522.

In some embodiments, one or more processes of the method 100, one or more processes of the method 200, one or more processes of the method 300, and/or one or more processes of the method 400 are performed by the mobile device 502. For example, the processor 516 of the mobile device 502 processes the data collected by the one or more sensors 524 to perform one or more processes of the method 100, one or more processes of the method 200, one or more processes of the method 300, and/or one or more processes of the method 400.

III. Examples of Certain Embodiments of the Present Disclosure

According to some embodiments, a method for predicting driving behaviors of a driver by transforming trip data into an image representation includes receiving trip data of one or more trips of a driver and dividing the trip data into a plurality of trip data segments based on a predetermined time period. Each trip data segment corresponds to a portion of the one or more trips. The method further includes transforming the plurality of trip data segments into an image representation, and determining predicted driving behaviors of the driver based on the image representation of the one or more trips using a prediction model. For example, the method is implemented according to at least FIG. 1, FIG. 2, FIG. 3, and/or FIG. 4.

According to certain embodiments, a computing device for predicting driving behaviors of a driver by transforming trip data into an image representation includes a processor and a memory having a plurality of instructions stored thereon that, when executed by the processor. The instructions, when executed, cause the one or more processors to receive trip data of one or more trips of a driver and divide the trip data into a plurality of trip data segments based on a predetermined time period. Each trip data segment corresponds to a portion of the one or more trips. Also, the instructions, when executed, cause the one or more processors to transform the plurality of trip data segments into an image representation, and determine predicted driving behaviors of the driver based on the image representation of the one or more trips using a prediction model. For example, the computing device is implemented according to at least FIG. 5.

According to some embodiments, a non-transitory computer-readable medium stores instructions for predicting driving behaviors of a driver by transforming trip data into an image representation. The instructions are executed by one or more processors of a computing device. The non-transitory computer-readable medium includes instructions receive trip data of one or more trips of a driver, and divide the trip data into a plurality of trip data segments based on a predetermined time period. Each trip data segment corresponds to a portion of the one or more trips. Also, the non-transitory computer-readable medium includes instructions to transform the plurality of trip data segments into an image representation, and determine predicted driving behaviors of the driver based on the image representation of the one or more trips using a prediction model. For example, the non-transitory computer-readable medium is implemented according to at least FIG. 1, FIG. 2, FIG. 3, and/or FIG. 4.

IV. Examples of Machine Learning According to Certain Embodiments

According to some embodiments, a processor or a processing element may be trained using supervised machine learning, unsupervised machine learning, and the machine learning may employ an artificial neural network, which, for example, may be a convolutional neural network (CNN), a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques, unsupervised machine learning techniques, and/or self-supervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs. Similar to the unsupervised machine learning, in self-supervised machine learning, the processing element may need to find its own structure in unlabeled example inputs. However, the self-supervised machine learning has a lot of supervisory signals that may act as feedback in the training process.

V. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include mobile devices and servers. A mobile device and server are generally remote from each other and typically interact through a communication network. The relationship of mobile device and server arises by virtue of computer programs running on the respective computers and having a mobile device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method comprising:
   receiving, by one or more processors, trip data of one or more trips of a driver from one or more sensors;
   dividing, by the one or more processors, the trip data into a plurality of trip data segments based on a predetermined time period, each trip data segment corresponding to a portion of the one or more trips;
   transforming, by the one or more processors, the plurality of trip data segments into a multi-dimensional graphical representation beyond two dimensions, by generating a two-dimensional graphical representation using relative longitude and latitude coordinates extracted from the trip data as indexes and adding depth to each point of the two-dimensional graphical representation, wherein the depth includes one or more channels representing sensor data comprising (i) one or more of acceleration, braking, speed, orientation, or angular velocity and (ii) a time channel indicating a chronological sequence, to form a high-depth image-like tensor, and wherein the multi-dimensional graphical representation is divided into smaller patches; and
   determining, by the one or more processors, predicted driving behaviors of the driver by feeding the smaller patches of the multi-dimensional graphical representation into a prediction model to extract features indicative of driving behaviors including at least one of sudden acceleration, sudden braking, frequent braking, sharp cornering, or slow cornering.

2. The method of claim 1, wherein transforming the plurality of trip data segments into the multi-dimensional graphical representation beyond two dimensions comprises:
   generating the two-dimensional graphical representation and adding the depth to form the high-depth image-like tensor, further comprising:
      dividing the multi-dimensional graphical representation into the smaller patches using a patchify algorithm, wherein the smaller patches comprise multi-dimensional graphical representations beyond two dimensions of a corresponding portion of a trip data segment.

3. The method of claim 1, further comprising training the prediction model, wherein training the prediction model comprises:
   receiving reference trip data of reference trips of a plurality of reference drivers;
   transforming the reference trip data into a training multi-dimensional graphical representation beyond two dimensions; and
   training the prediction model using the training multi-dimensional graphical representation,
   wherein the reference trip data includes telematics data associated with the reference trips taken by at least one driver of the plurality of reference drivers.

4. The method of claim 3, wherein transforming the reference trip data into the training multi-dimensional graphical representation beyond two dimensions comprises:
   dividing, for each reference trip, the reference trip data into a plurality of reference trip data segments based on a predetermined time period, each reference trip data segment corresponding to a portion of the reference trips; and
   generating, for each reference trip data segment, the training multi-dimensional graphical representation representing relative positions of a corresponding driver during the predetermined time period by extracting location information from the corresponding reference trip data segment using relative longitude and latitude coordinates as indexes and adding depth including one or more channels representing sensor data comprising (i) one or more of acceleration, braking, speed, orientation, or angular velocity and (ii) a time channel indicating a chronological sequence.

5. The method of claim 4, further comprising:
   dividing the training multi-dimensional graphical representation for each reference trip data segment into smaller patches using a patchify algorithm; and
   training the prediction model using the smaller patches of the training multi-dimensional graphical representation.

6. The method of claim 1, wherein the prediction model is a convolutional neural network (CNN).

7. A computing device comprising:
   a processor; and
   a memory having a plurality of instructions stored thereon that, when executed by the processor, cause the computing device to:
      receive trip data of one or more trips of a driver from one or more sensors;
      divide the trip data into a plurality of trip data segments based on a predetermined time period, each trip data segment corresponding to a portion of the one or more trips;

transform the plurality of trip data segments into a multi-dimensional graphical representation beyond two dimensions, by generating a two-dimensional graphical representation using relative longitude and latitude coordinates extracted from the trip data as indexes and adding depth to each point of the two-dimensional graphical representation, wherein the depth includes one or more channels representing sensor data comprising (i) one or more of acceleration, braking, speed, orientation, or angular velocity and (ii) a time channel indicating a chronological sequence, to form a high-depth image-like tensor, and wherein the multi-dimensional graphical representation is divided into smaller patches; and determine predicted driving behaviors by feeding the smaller patches of the multi-dimensional graphical representation into a prediction model to extract features indicative of driving behaviors including at least one of sudden acceleration, sudden braking, frequent braking, sharp cornering, or slow cornering.

8. The computing device of claim 7, wherein to transform the plurality of trip data segments into the multi-dimensional graphical representation beyond two dimensions comprises to:

generate the two-dimensional graphical representation and add the depth to form the high-depth image-like tensor, further comprising:
divide the multi-dimensional graphical representation into the smaller patches using a patchify algorithm, wherein the smaller patches comprise multi-dimensional graphical representations beyond two dimensions of a corresponding portion of a trip data segment.

9. The computing device of claim 7, wherein the plurality of instructions, when executed, further cause the computing device to train the prediction model, wherein to train the prediction model comprises to:

receive reference trip data of reference trips of a plurality of reference drivers;
transform the reference trip data into a training multi-dimensional graphical representation beyond two dimensions; and
train the prediction model using the training multi-dimensional graphical representation,
wherein the reference trip data includes telematics data associated with the reference trips taken by at least one driver of the plurality of reference drivers.

10. The computing device of claim 9, wherein to transform the reference trip data into the training multi-dimensional graphical representation beyond two dimensions comprises to:

divide, for each reference trip, the reference trip data into a plurality of reference trip data segments based on a predetermined time period, each reference trip data segment corresponding to a portion of the reference trips; and
generate, for each reference trip data segment, the training multi-dimensional graphical representation representing relative positions of a corresponding driver during the predetermined time period by extracting location information from the corresponding reference trip data segment using relative longitude and latitude coordinates as indexes and adding depth including one or more channels representing sensor data comprising (i) one or more of acceleration, braking, speed, orientation, or angular velocity and (ii) a time channel indicating a chronological sequence.

11. A non-transitory computer-readable medium storing instructions, wherein the instructions, upon execution, cause a computing device to:

receive trip data of one or more trips of a driver from one or more sensors;
divide the trip data into a plurality of trip data segments based on a predetermined time period, each trip data segment corresponding to a portion of the one or more trips;
transform the plurality of trip data segments into a multi-dimensional graphical representation beyond two dimensions, by generating a two-dimensional graphical representation using relative longitude and latitude coordinates extracted from the trip data as indexes and adding depth to each point of the two-dimensional graphical representation, wherein the depth includes one or more channels representing sensor data comprising (i) one or more of acceleration, braking, speed, orientation, or angular velocity and (ii) a time channel indicating a chronological sequence, to form a high-depth image-like tensor, and wherein the multi-dimensional graphical representation is divided into smaller patches; and
determine predicted driving behaviors by feeding the smaller patches of the multi-dimensional graphical representation into a prediction model to extract features indicative of driving behaviors including at least one of sudden acceleration, sudden braking, frequent braking, sharp cornering, or slow cornering.

12. The non-transitory computer-readable medium of claim 11, wherein to transform the plurality of trip data segments into the multi-dimensional graphical representation beyond two dimensions comprises:

generate the two-dimensional graphical representation and add the depth to form the high-depth image-like tensor, further comprising:
dividing the multi-dimensional graphical representation into smaller patches using a patchify algorithm, wherein the smaller patches comprise multi-dimensional graphical representations beyond two dimensions of a corresponding portion of a trip data segment.

13. The non-transitory computer-readable medium of claim 11, wherein the computing device is further to train the prediction model, wherein to train the prediction model comprises to:

receive reference trip data of reference trips of a plurality of reference drivers;
transform the reference trip data into a training multi-dimensional graphical representation beyond two dimensions; and
train the prediction model using the training multi-dimensional graphical representation,
wherein the reference trip data includes telematics data associated with the reference trips taken by at least one driver of the plurality of reference drivers.

14. The non-transitory computer-readable medium of claim 13, wherein to transform the reference trip data into the training multi-dimensional graphical representation beyond two dimensions comprises to:

divide, for each reference trip, the reference trip data into a plurality of reference trip data segments based on a predetermined time period, each reference trip data segment corresponding to a portion of the reference trips; and
generate, for each reference trip data segment, the training multi-dimensional graphical representation representing relative positions of a corresponding driver during the predetermined time period by extracting location information from the corresponding reference trip data segment using relative longitude and latitude coordinates as indexes and adding depth including one or more channels representing sensor data comprising (i) one or more of acceleration, braking, speed, orientation, or angular velocity and (ii) a time channel indicating a chronological sequence.

15. The non-transitory computer-readable medium of claim 14, further comprising:
    dividing the training multi-dimensional graphical representation for each reference trip data segment into smaller patches using a patchify algorithm; and
    training the prediction model using the smaller patches of the training multi-dimensional graphical representation.

16. The non-transitory computer-readable medium of claim 13, wherein to receive reference trip data of reference trips of a plurality of reference drivers comprises to:
    select the plurality of reference drivers based on one or more shared characteristics, wherein the shared characteristics comprise at least one of a common occupation, a common geographic locality, or a common vehicle type; and
    collect the reference trip data continuously or at predetermined time intervals from one or more sensors associated with vehicles or mobile devices of the plurality of reference drivers.

17. The non-transitory computer-readable medium of claim 11, wherein determining the predicted driving behaviors of the driver comprises:
    inputting the smaller patches of the multi-dimensional graphical representation into the prediction model.

18. The non-transitory computer-readable medium of claim 11, wherein the prediction model is a convolutional neural network (CNN).

19. The non-transitory computer-readable medium of claim 11, wherein to transform the plurality of trip data segments into the multi-dimensional graphical representation beyond two dimensions comprises to:
    generate the two-dimensional graphical representation and add the depth to form the high-depth image-like tensor, further comprising:
    divide the multi-dimensional graphical representation into smaller patches using a patchify algorithm, wherein the smaller patches comprise multi-dimensional graphical representations beyond two dimensions of a corresponding portion of a trip data segment; and
    input the smaller patches of the multi-dimensional graphical representation into the prediction model to determine the predicted driving behaviors.

* * * * *